United States Patent [19]
Stagnitto et al.

[11] Patent Number: 5,947,880
[45] Date of Patent: Sep. 7, 1999

[54] SELF-ALIGNING TOOL HOLDER FOR USE WITH ROBOTIC ARMS

[75] Inventors: Joseph E. Stagnitto, Rochester; Camiel J. Raes, Phelps; James A. White, Conesus, all of N.Y.

[73] Assignee: Eastman Kodak Company, Rochester, N.Y.

[21] Appl. No.: 09/069,601

[22] Filed: Apr. 29, 1998

[51] Int. Cl.[6] .................................................. B23Q 3/155
[52] U.S. Cl. ............................. 483/58; 483/29; 483/54; 483/901
[58] Field of Search ................................. 483/59, 60, 58, 483/901, 902, 54, 55, 66, 67, 29; 901/41

[56] References Cited

U.S. PATENT DOCUMENTS

| | | | |
|---|---|---|---|
| 3,312,370 | 4/1967 | Kolarich et al. | 221/13 |
| 3,568,849 | 3/1971 | Hutchison | 211/60 |
| 3,816,890 | 6/1974 | Cupler, II | 29/26 A |
| 4,486,928 | 12/1984 | Tucker et al. | 29/26 |
| 4,604,787 | 8/1986 | Silvers, Jr. | 29/568 |
| 4,648,171 | 3/1987 | Yasukawa | 29/568 |
| 4,660,274 | 4/1987 | Goumas et al. | 29/568 |
| 4,706,372 | 11/1987 | Ferrero et al. | 29/568 |
| 5,192,844 | 3/1993 | Todd et al. | 219/85.16 |
| 5,256,128 | 10/1993 | Neumann | 483/901 |
| 5,376,062 | 12/1994 | Zeichner | 483/55 |

Primary Examiner—William Briggs
Attorney, Agent, or Firm—Mark G. Bocchetti

[57] ABSTRACT

A tool rack support system which includes leaf spring type flexures which allow the tool rack a measure of compliance in both the horizontal and vertical planes. The support system comprises preferably two flexure support assemblies with each assembly preferably including two cantilevered, horizontally oriented, planar flexures and two cantilevered, vertically oriented, substantially planar flexures which are ultimately supported from the distal end of the horizontally oriented, planar flexures. The vertically oriented, planar flexures give the support system a measure of compliance which allows the tool rack to be moved discretely in the horizontal plane as a result of a robotic arm acquiring or delivering a tool to the tool rack. The horizontally oriented, substantially planar flexures of the support system give the support assembly vertical compliancy to allow the tool rack to be moved discretely in the vertical direction as a result of a robotic arm acquiring or delivering a tool from the tool rack. Travel stops are provided to limit the amount of vertical travel which can be imparted to be horizontally oriented, planar flexures.

14 Claims, 4 Drawing Sheets

SELF-ALIGNING TOOL HOLDER FOR USE WITH ROBOTIC ARMS

FIELD OF THE INVENTION

The present invention relates generally to tool holder assemblies and, more particularly, to tool racks for holding multiple tools therein allowing for a robotic arm to automatically acquire tools therefrom and deliver tools thereto.

BACKGROUND OF THE INVENTION

A variety of tool holders are known in the prior art for holding multiple tools therein for acquisition by a robotic arm. One of such tool holders is taught in U.S. Pat. No. 4,486,928 to Tucker et al which actually employs a plurality of tool holders located proximate to one another at a tool station. Each tool holder includes a plate supported by four corner posts. In one embodiment taught by Tucker et al, an individual tool is inserted into a receiving hole in the plate of the individual tool holder and retained therein through rotation of the tool to effect what is essentially a bayonet mount. In an alternative embodiment, Tucker et al teaches the use of a solenoid actuated clamp to hold individual tools in the individual tool holders.

U.S. Pat. No. 3,816,890 to Cupler, II, teaches a tool positioning mechanism which includes a vertically moveable placement rack supporting a horizontally slidable tool support rack thereon for vertical movement therewith. The tool support rack is horizontally moveable relative to the vertically moveable placement rack in stepwise increments corresponding in distance to the spacing between preselected tool support grooves formed in the slidable tool support rack.

U.S. Pat. No. 4,604,787 to Silvers, Jr., teaches an end effector rack for use with a manipulator arm. The end effector rack receives and supports a plurality of end effectors therein so that the manipulator arm can position an end effector in the rack with lateral movement, disengage the arm from the end effector with an axial movement, engage the arm with another end effector by an axially movement in the opposite direction, and remove the new end effector by a lateral movement. The end effector rack includes a plurality of slots in two spaced vertically oriented plates. Each end effector includes a flange which resides between the vertically oriented plates when the end effector is supported therein.

The prior art requires precise positioning of the tools in order to be inserted into their respective tool holders. The prior art fails to teach a compliance mechanism which is self-aligning thereby allowing for a relatively simple tongue and groove mating of the tool within the tool holder.

SUMMARY OF THE INVENTION

It is, therefore, an object of the present invention to provide a tool rack for supporting multiple tools therein for use with robotic arms which allows for less precision of location for the insertion of tools therein by the robotic arm.

It is a further object of the present invention to provide a support system for a tool rack which allows for horizontal compliance of the tool rack in response to the insertion of a tool therein by a robotic arm.

It is a further object of the present invention to provide a support system for a tool rack which allows for vertical compliance of the tool rack in response to the insertion of a tool therein by a robotic arm.

Briefly stated, the foregoing and numerous other features, objects and advantages of the present invention will become readily apparent upon a reading of the detailed description, claims and drawings set forth herein. These features, objects and advantages are accomplished by mounting the tool rack on a support system which includes leaf spring type flexures which allow the tool rack a measure of compliance in both the horizontal and vertical planes. The support system comprises preferably two flexure support assemblies with each assembly preferably including two cantilevered planar members with the planar members oriented in parallel horizontal planes. Each assembly also preferably includes two vertically oriented, substantially planar flexures which are ultimately supported from the distal end of the horizontally oriented, substantially planar flexures. The vertically oriented, substantially planar flexures extend laterally back over the horizontally oriented substantially planar flexures toward the tool rack with the opposite end of the vertically oriented, substantially planar flexures connected to extensions of the tool rack to thereby support the tool rack therefrom. The vertically oriented, substantially planar flexures give the support system a measure of compliance which allow the tool rack to be moved discretely in the horizontal plane as a result of a robotic arm acquiring or delivering a tool to the tool rack. The horizontally oriented, substantially planar flexures of the support system of the present invention give the support assembly vertically compliancy to allow the tool rack to be moved discretely in the vertical direction as a result of a robotic arm acquiring or delivering a tool from the tool rack. Travel stops are provided to limit the amount of vertical travel which can be imparted to the horizontally oriented, planar flexures.

The prior art fails to teach a compliant tool rack support system. Further, the prior art fails to teach a support system which has two dimensional compliancy which allows for an exact capture technique for individual tools requiring less precise positioning by the robotic arm to acquire individual tools from the tool rack or to deliver such tools to the tool rack.

DETAILED DESCRIPTION OF THE INVENTION

Figure 1:
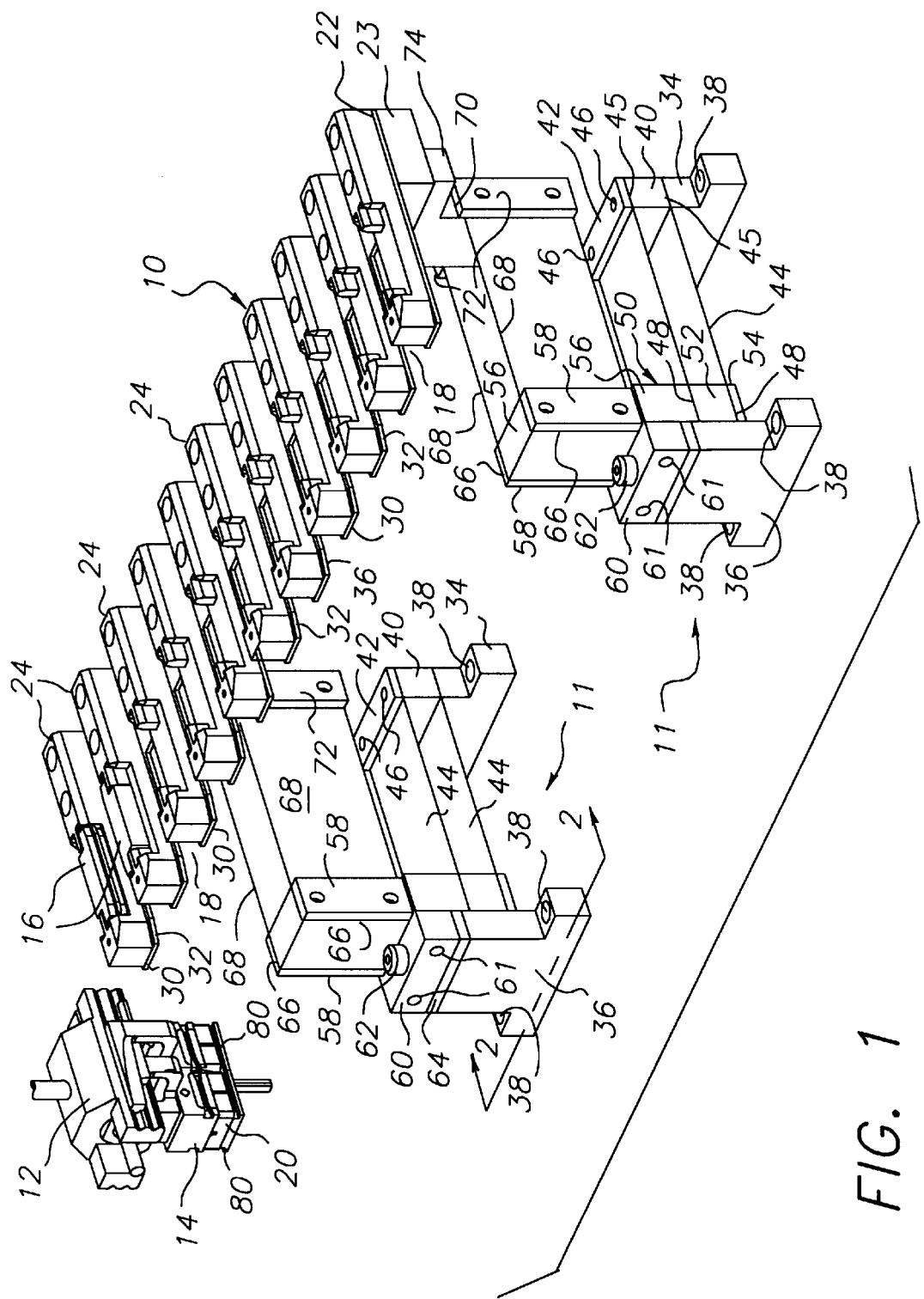
FIG. 1 is a perspective view of a tool rack support on two of the compliance support assemblies of the present invention.

Turning first to FIG. 1, there is shown a tool rack 10 supported on a pair of support assemblies 11. The tool rack 10 is adapted to be used in conjunction with a tool interface portion 12 of a robotic arm (not shown). Attached to tool interface portion 12 is a tool attachment block 14. Tool rack 10 consists of a series of tool slots 18, each of which is capable of providing residence for a particular tool. As depicted in FIG. 1, none of the tool slots 18 has a tool residing therein although a tool 20 is shown as supported from tool attachment block 14 and the tool interface portion 12 of the robotic arm. Tool rack 10 includes a base plate 22 supported on beam 23. Affixed to base plate 22 are a series of blocks 24 with each of such blocks 24 having a pair of receptacles 26 therein. Each receptacle is configured to provide residence for a magnetic shunt bar 16. Base plate 22 includes a plurality of fingers 30 extending outward therefrom in a cantilevered configuration. Blocks 24 extend from the base plate section out onto fingers 30. The width of each block 24 is less than the width of each finger 30 thereby providing a projecting edge or tongue 32 on each side of each block 24. Tool slots 18 between adjacent fingers 30 provide a nesting position in which stored tools 20 are supported. Attachment of a tool 20 tool attachment block 14 is accomplished through magnetic force alone. In order to acquire a tool 20 from a tool slot 18, the robotic arm moves vertically downward such that tool attachment block 14 engages the desired tool 20. The robotic arm then moves the tool attachment block 14 horizontally to slide the tool 20 from its associated tool slot 18. In order to leave a tool 20 in a tool slot 18, the robotic arm insert the tool 20 into a tool slot 18 by moving horizontally. With the tool 20 nested in a tool slot 18 the robotic arm lifts the tool attachment block 14 vertically to thereby separate the tool attachment block 14 from tool 20. Through the use of shunt bars 16, magnetic flux is rerouted to make detachment of tool 20 from tool attachment blocks 14 easy for the robot to accomplish. The magnetic flux is substantially rerouted such that the magnetic attachment force between tool attachment block 14 and tool 20 is greatly reduced. This allows the robot to easily overcome the remaining attachment force. Tool rack 10, tool interface 12, tool attachment block 14, and shunt bars 16 are discussed in greater detail in copending U.S. application Ser. No. 09/048,441, entitled TOOL ATTACHMENT AND RELEASE DEVICE FOR ROBOTIC ARMS which is hereby incorporated herein by reference.

Figure 2:
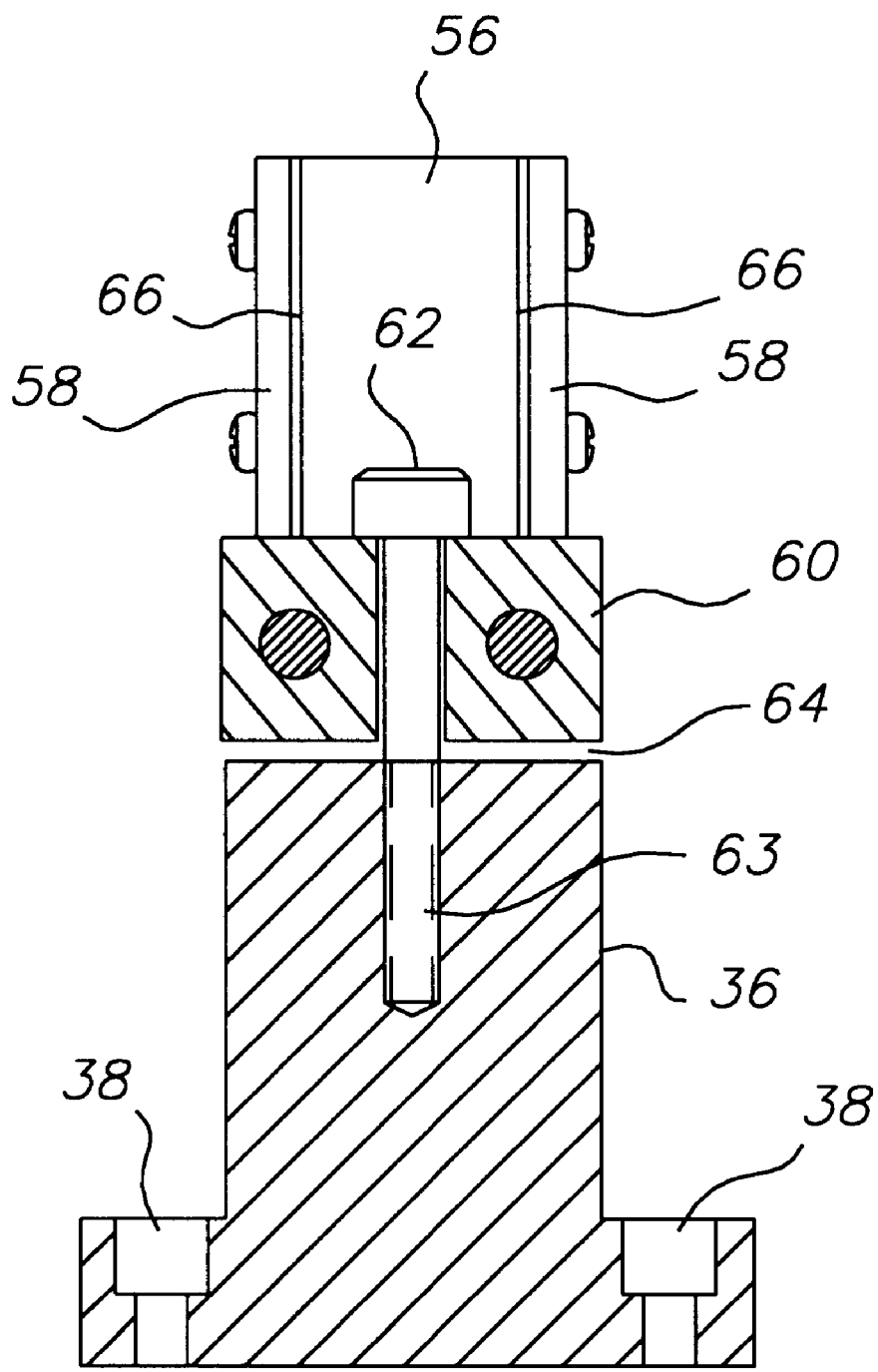
FIG. 2 is a sectional view taken along line 2—2 of FIG. 1.

Each support assembly 11 includes a first pier 34 and a second pier 36. Each first pier 34 and second pier 36 include a pair of bores 38 to allow for attachment of piers 34, 36 to a platform or table surface (not shown). Residing on top of first piers 34 are spacer bars 40 and cap plates 42. Cantilevered from first piers 34 and spacer bars 40 are a pair of leaf springs or planar flexures 44 with the proximal end 45 of one of such planar flexures 44 extending between first pier 34 and spacer bar 40 and the proximal end 45 of the other of the planar flexures 44 extending from between spacer 40 and cap plate 42. First piers 34 combine with spacer bars 40 and cap plates 42 to form first pier assemblies. There are bores 46 in cap plates 42 which align with bores through planar flexures 44, spacer bars 40 and first piers 34 allowing for the assembly of first pier assemblies by means of threaded fasteners inserted through bores 46. The distal ends 48 of planar flexures 44 connect to a bracket assembly 50. Each bracket assembly 50 includes a spacer bar 52, bottom cap plate 54, bracket 56, retainer plates 58 and a projecting member 60. Bottom cap plate 54, the distal end 48 of planar flexures 44, spacer bar 52 and brackets 56 are assembled to one another preferably by means of threaded fasteners (not shown). Similarly, projecting member 60 is assembled to bracket 56 by means of threaded fasteners inserted through bores 61, although it would be possible to integrally fabricate bracket 56 and projecting member 60 as a single component. There is a bore through each projecting member 60 through which machine screw 62 inserts to affix to second pier 36 by engaging a threaded bore 63 therein (See FIG. 2). In the normal, at rest position, there is a gap 64 between projecting member 60 and second pier 36. Gap 64 limits the amount of downward travel that can be imparted to the distal end 48 of planar flexures 44. In such manner, second pier 36 acts as a travel stop for downward flexure. Similarly, machine screw 62 serves as travel stop in the upward direction thereby limiting the upward travel that can be imparted to the distal ends 48 of planar flexures 44.

Preferably, machine screw 62 is positioned to set the normal, at rest vertical position of tool rack 10 such that flexures 44 cause projecting member 60 to bear against the head of machine screw 62.

Sandwiched between retainer plates 58 and the upper portion of bracket 56 are the proximal ends 66 of vertically oriented planar flexures 68. Vertically oriented planar flexures 68 extend back over the horizontally oriented planar flexures 44 toward first piers 34. The distal ends 70 of vertically oriented planar flexures 68 are sandwiched between retainer plates 72 and T-supports 74. T-supports 74 are affixed to beam 23 which is in turn, as described earlier, attached to base plate 22 and extends the length thereof.

It should be appreciated by those skilled in the art that a single horizontally oriented planar flexure can be substituted the pair of planar flexures 44 and a single vertically oriented planar flexure can be substituted for the pair of vertically oriented planar flexures 68 of the preferred embodiment. However, using pairs of separated planar flexures 44, 68 yields a structure which is more resistant to twisting of the planar flexures 44, 68 than might readily be accomplished using single flexures in place of such pairs of flexures 44, 68. In such manner, horizontally oriented planar flexures 44 allow for vertical flexing with a zero, or negligible horizontal flexing component and vertically oriented planar flexures 68 allow for horizontal flexing with a zero, or negligible vertical flexing component. Further, movement of tool rack 10 through flexing of the spaced pairs of planar flexures 44, 68, is maintained as substantially linear. That is, base plate 22 is always maintained in a substantially horizontal plane. With regard to the spacing of each pair of flexures 44, 68, minimum spacing should be such that at full deflection individual flexures 44 should not come in contact with one another and individual flexures 68 should not come in contact with one another.

Figure 3:
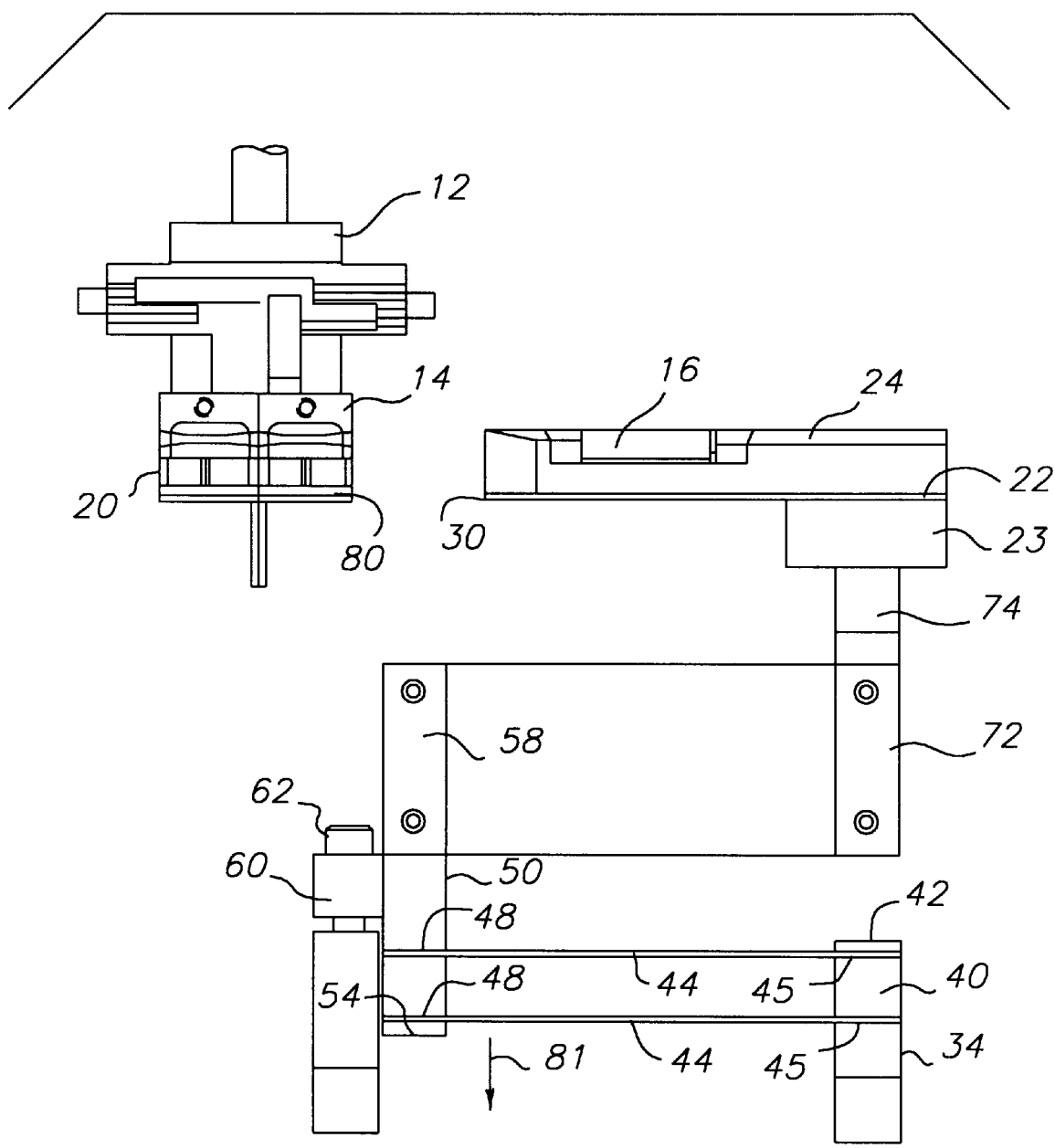
FIG. 3 is a side elevation view of the tool rack and support assemblies of the present invention as depicted in FIG. 1.

Turning next to FIG. 3, there is shown a side elevational view of the tool rack 10 supported on the support assemblies 11 of the present invention. Also depicted is the tool interface portion 12 of a robotic arm (not shown) having a tool attachment block 14 with a tool 20 attached thereto. As described more fully in the aforementioned U.S. application Ser. No. 09/048,441 which has been incorporated herein by reference, in order to deliver a tool 20 to tool rack 10 or extract a tool 20 from tool rack 10, the robotic arm moves the tool interface portion 12 laterally to approach a specified tool slot 18. When the tool 20 is being delivered to a tool slot 18, tongues 32 (as shown in FIGS. 1 and 3) insert into grooves 80 in tool 20 requiring the lateral motion of tool interface portion 12. Similarly, when extracting a tool 20 from a tool slot, the reverse lateral movement is required to slide tool 20 away from tool slot 18 such that tongues 32 no longer reside within grooves 80. The support assemblies 11 of the present invention allow the tool rack 10 some measure of compliancy if grooves 80 are not at the precise elevation of tongues 32. Horizontally oriented planar flexures 44 flex in the vertical direction, downward as indicated by arrow 81, thereby allowing tool rack 10 to shift downward in order to accommodate slight misalignment between tongues 32 and grooves 80 along the Z-axis.

Figure 4:
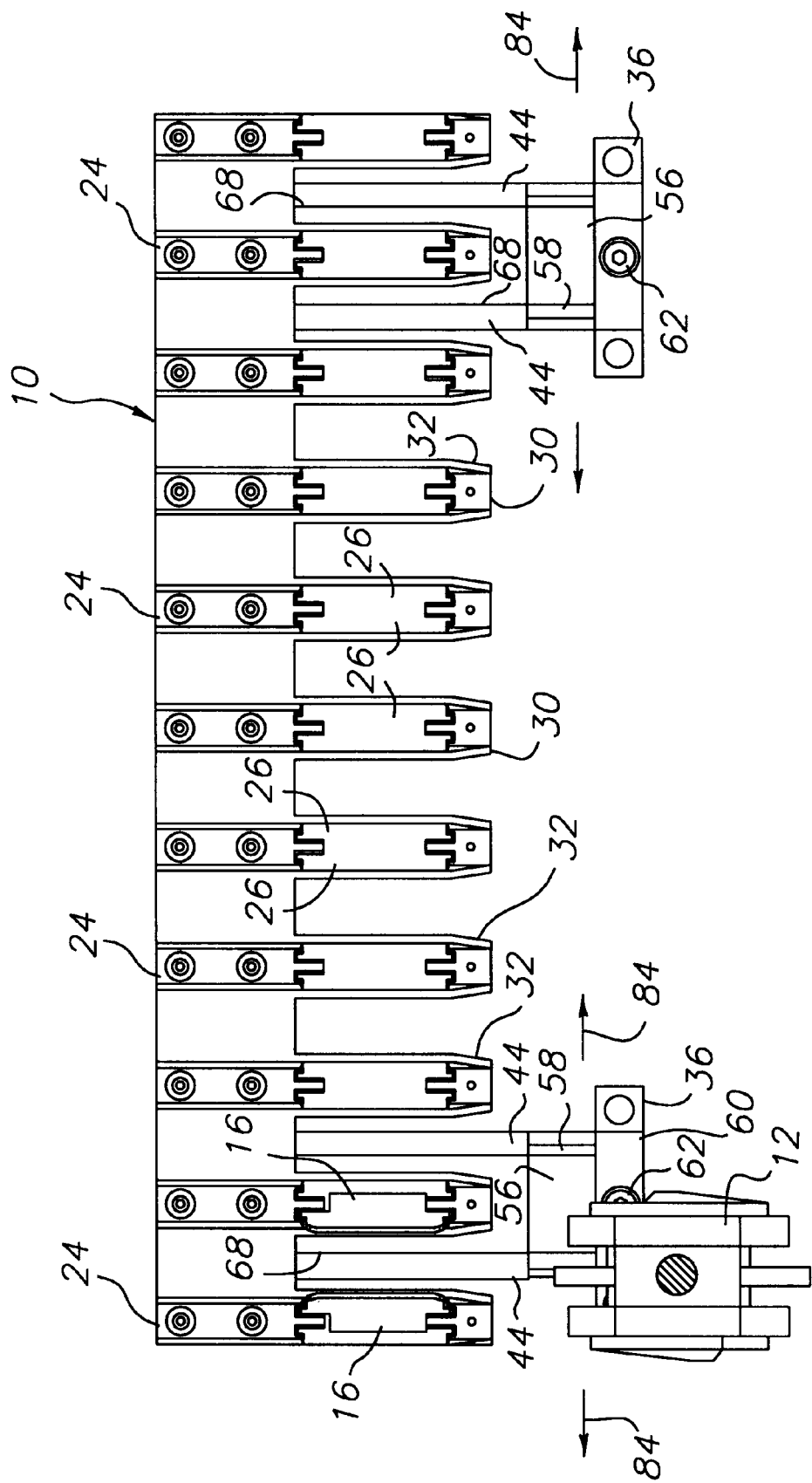
FIG. 4 is a top plan view of the tool rack and support assemblies of the present invention as depicted in FIG. 1.

Looking next at FIG. 4, there is shown a top plan view of the tool rack 10 supported on support assemblies 11 of the present invention. Again, there is shown the tool interface portion 12 of a robotic arm on approach to tool slot 18 to either acquire a tool 20 therefrom or to deliver a tool 20 thereto. Tongues 32 must insert into grooves 80. The support assemblies 11 of the present invention allow the tool rack 10 a measure of compliancy along the X-axis if the robotic arm has not precisely aligned the grooves 80 with tongues 32 along the X-axis. In such a case of slight misalignment, vertically oriented planar flexures 68 can flex horizontally as indicated by arrows 84. This, in turn, allows tool rack 10 to move in either direction along the X-axis in response to such slight misalignment thereby allowing a specific tool slot 18 to move laterally to accommodate the slightly misaligned tool 20. These self-aligning features make the approach and depart vectors of a tool change less critical. Further, these compliancy features allow for a tongue and groove type of tool capture arrangement within tool rack 10. With each support assembly 11 having two horizontally oriented planar flexures 44 and two vertically oriented planar flexures 68, and with each pair being separated by a distance, compliance is achieved which allows for linear motion, free of backlash and without the wear and tear of conventional pivot arrangements.

From the foregoing, it will be seen that this invention is one well adapted to attain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A compliant support system for a tool rack in which tools are supported for automated tool changing by a robotic arm, said support system comprising:
   (a) a first pier;
   (b) at least one horizontally oriented, substantially planar flexure cantilevered from a proximal end thereof from said first pier;
   (c) a bracket affixed to a distal end of said at least one horizontally oriented planar flexure and projecting upward therefrom:
   (d) at least one vertically oriented, substantially planar flexure affixed at a first end to said bracket, said at least one vertically oriented, substantially planar flexure cantilevered back over said at least one horizontally oriented substantially planar flexure; and
   (e) a support extending from the tool rack, said support attached a second end of said at least one vertically oriented, substantially planar flexure.

2. A compliant support system as recited in claim 1 further comprising:
   a first travel stop limiting an amount of downward travel that can be imparted to said distal end of said at least one horizontally oriented, planar flexure.

3. A compliant support system as recited in claim 1 further comprising:
   a second travel stop limiting an amount of upward travel that can be imparted to said distal end of said at least one horizontally oriented planar flexure.

4. A compliant support system as recited in claim 2 wherein:
   said first travel stop is a second pier positioned beneath said bracket.

5. A compliant support system as recited in claim 4 wherein:
   said bracket includes a block projecting therefrom, said second pier positioned beneath said block to create a gap between said block and said second pier, said gap defining a maximum distance said distal end may flex vertically downward.

6. A compliant support system as recited in claim 5 further comprising:
   a second travel stop limiting an amount of upward travel that can be imparted to said distal end, said second travel stop projecting from said second pier and including a flange portion for engaging a surface of said bracket at an upper limit of said distal end
   at least one horizontally oriented substantially planar flexure cantilevered from a proximal end thereof from said first pier.

7. A compliant support system for a tool rack in which tools are supported for automated tool changing by a robotic arm, said support system comprising:
   two support assemblies, each support assemblies including
   (a) a first pier;
   (b) at least one horizontally oriented substantially planar flexure cantilevered from a proximal end thereof from said first pier;
   (c) a bracket affixed to a distal end of said at least one horizontally oriented planar flexure and projecting upward therefrom:
   (d) at least one vertically oriented, substantially planar flexure affixed at a first end to said bracket, said at least one vertically oriented, substantially planar flexure cantilevered back over said at least one horizontally oriented substantially planar flexure; and
   (e) a support extending from the tool rack, said support attached a second end of said at least one vertically oriented, substantially planar flexure.

8. A compliant support system for a tool rack in which tools are supported for automated tool changing by a robotic arm, said support system comprising:
   (a) a first pier;
   (b) two horizontally oriented substantially planar flexures residing in a parallel relationship to each other, said two horizontally oriented substantially planar flexures cantilevered at a proximal end thereof from said first pier;
   (c) a bracket affixed to a distal end of each of said two horizontally oriented planar flexure and projecting upward therefrom:
   (d) two vertically oriented, substantially planar flexures affixed at a first end thereof to said bracket, said two vertically oriented, substantially planar flexures cantilevered back over said two horizontally oriented, substantially planar flexures; and
   (e) a support extending from the tool rack, said support attached a second end of said two vertically oriented, substantially planar flexures.

9. A compliant support system as recited in claim 8 wherein:
   said two vertically oriented, substantially planar flexures are spaced apart from each other, and said two horizontally oriented, substantially planar flexures are spaced apart from each other.

10. A compliant support system as recited in claim 9 further comprising:
   a first travel stop limiting an amount of downward travel that can be imparted to said distal ends of said two horizontally oriented, planar flexures.

11. A compliant support system as recited in claim 9 further comprising:

a second travel stop limiting an amount of upward travel that can be imparted to said distal ends of said two horizontally oriented, planar flexures.

12. A compliant support system as recited in claim 10 wherein:

said first travel stop is a second pier positioned beneath said bracket.

13. A compliant support system as recited in claim 12 wherein:

said bracket includes a block projecting therefrom, said second pier positioned beneath said block to create a gap between said block and said second pier, said gap defining a maximum distance said distal ends may move vertically downward.

14. A compliant support system as recited in claim 13 further comprising:

a second travel stop limiting an amount of upward travel that can be imparted to said distal ends, said second travel stop projecting from said second pier and including a flange portion for engaging a surface of said bracket at an upper limit.

* * * * *